Feb. 6, 1934. R. J. NORTON 1,946,102
BRAKE ROTOR
Filed July 26, 1930
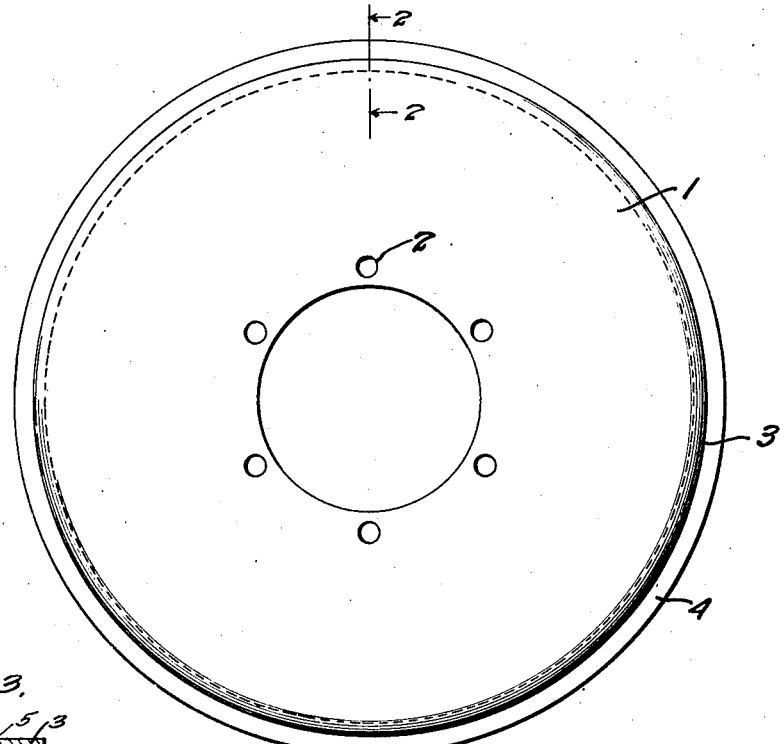
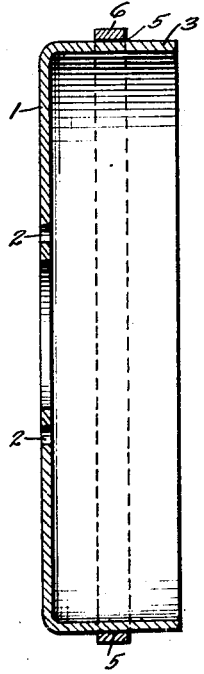
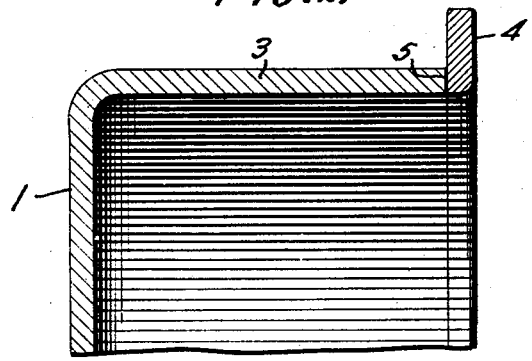
Inventor
Raymond J. Norton
By Semmes & Semmes
Attorneys Patented Feb. 6, 1934

1,946,102

UNITED STATES PATENT OFFICE 1,946,102

BRAKE ROTOR

Raymond J. Norton, Washington, D. C., assignor to Bendix Brake Company, South Bend, Ind., a corporation of Illinois Application July 26, 1930. Serial No. 471,012

7 Claims. (Cl. 188—218)

This invention relates to a drum rotor and more particularly to brake drums on automotive vehicles.

Certain characteristics are requisite for efficient automotive brake drums. These brake members should be of sufficient strength and rigidity to withstand the abrasive forces of frictional braking and the distortive effects of the expansion or contraction of juxtaposed elements.

As used on automobiles equipped with internally expanding brakes the brake drum structure includes as an almost essential adjunct a backing or dust plate which serves to close off the open face of the drum to protect the interior brake mechanism from dust and water. Since this structure comprises two metallic members, one of which is subjected to relatively wide range of temperatures, it has been found necessary to allow relatively large initial clearance between those portions of the drum and backing plate which form the closure. As a result, during early runs and before the brake drum has been heated up, the gap presented between the two members may permit the access of water, dust, and so forth.

It is an object of the present invention to so construct the brake drum that the initial clearance may be cut down to a practical minimum and at the same time to impart to the drum other desirable advantageous properties. The invention is herein shown and described with particular reference to a drum having a radially extending marginal lip at its open face; it is to be understood, however, that the principles of the invention are applicable to other specific types of drums. Broadly considered the invention comprehends the idea of forming that portion of the drum adjacent the backing plate of a material having a lower coefficient of expansion, and preferably of a higher tensile strength, than the remainder of the ferruginous drum. The preferred embodiment of the invention includes first, pressing or stamping out the brake drum from a suitable blank of deep draw steel and then treating the cylindrical braking flange portion in such a manner as to impart to it greater tensile strength and lower expansibility. Briefly considered, one preferred method of doing this is to form on the drum a marginal lip of a ferro-nickel of the invar range.

To enable a ready comprehension of the invention I have shown an embodiment of it in the accompanying drawing. In this the same reference numerals refer to similar parts throughout the several views of which Figure 1 is an elevation of the drum; and
Figure 2 is a section taken on line 2—2 of Figure 1.
Fig. 3 is a section of a modification of the device shown in Fig. 2.

As noted above the invention is applicable to any type of drum, that shown in the drawing being chosen as a conventional type used in automotive construction. This comprises a head 1, provided with the apertures 2, through which may pass the securing means which attach the drum to the wheels. Integrally formed with the head is a cylindrical brake flange 3. The drum is preferably formed by stamping it out from a suitable blank of metal.

In the present embodiment the marginal lip is comprised of a metal having a higher tensile strength and lower coefficient of expansion than the metal of the drum and which is attached to the drum. An example of such a structure is shown in the drawing. The breaking flange (as shown in Figure 2) terminates in a squared edge 5 to which the annulus 4 of the differential metal is secured. This annulus preferably comprises a ferro-nickel of the invar range, that is to say an alloy having approximately 36% of nickel. The annulus or ring is integrally joined to the drum by means of a fusion joint indicated at 5. This may be accomplished by seam or spot welding or any other suitable form of fusion. After such a treatment the marginal flange or lip 4 is, at least in part, integrally joined to the brake drum. If desired a full circumferential fusion joint may be obtained so as to increase the rigidity of the metal drum and prevent relative movement between the drum and the lip.

After such a treatment the brake drum in effect comprises two integral metallic sections of different physical characteristics, the major portion of the brake drum being the pressed metal, having the characteristics of metals of similar composition and the marginal lip comprising a metallic composition or alloy having a lower coefficient of expansion and a higher tensile strength. As a result of this the marginal lip serves as a rigidifying element at the open face of the drum and also cuts down on the degree of expansion which would otherwise obtain. Hence when the drum and backing plate are first associated only slight clearance may be allowed. Because of the very small gap existing between the drum and backing plate an effective structure is thereby presented which will exclude substantially all extraneous foreign matter.

It will be appreciated that the small clearance obtained is largely a function of the metal employed in the annulus. Since this is attached at the open face of the drum it inhibits or precludes bell-mouthed expansion of the drum, since both drum and annulus are unstressed under normal temperature conditions. Within the term "normal temperature conditions" is included the range of ordinary atmospheric temperatures, such as the drum would attain without application of the brakes. It will be understood, however, that, if desired, an annulus 6 of ferro-nickel or other metal of low coefficient of expansion may be fused to the exterior surface of the drum at some point intermediate the free or marginal edge and the head, as shown in Figure 3. In this position the ring or annulus will serve to rigidify the drum and to minimize distortion.

While a preferred embodiment of the invention has been described, it is to be understood that this is given merely as an example of one physical embodiment and since the principle of the invention may be incorporated in other specific structures it is not intended to be limited to that used except as such limitations are clearly imposed by the appended claims.

This application is a continuation in part of a prior application, Serial No. 321,452, filed November 23, 1928, patented April 14, 1931, No. 1,800,900.

I claim:

1. A pressed steel brake drum having a marginal lip of a metal of higher tensile strength welded thereto the brake drum being unstressed under normal temperature conditions.

2. A pressed steel brake drum having a marginal flange of a metal of lower coefficient of expansion welded thereto the brake drum being unstressed under normal temperature conditions.

3. A pressed steel brake drum having a marginal flange of a metal having a higher tensile strength and lower coefficient of expansion welded thereto the brake drum being unstressed under normal temperature conditions.

4. A brake drum comprising a braking flange and an invar section welded to the flange the brake drum being unstressed under normal temperature conditions.

5. A brake drum comprising a braking flange and an exterior ring of a metal of greater tensile strength welded to the flange the brake drum being unstressed under normal temperature conditions.

6. A brake drum of pressed metal having a substantially cylindrical braking flange and an external annulus secured to the flange intermediate its ends, which annulus is comprised of a material of lower coefficient of thermal expansion than the flange.

7. A brake drum having an integral head and flange of pressed steel, a metal annulus encircling the flange positioned intermediate its ends and integrally attached to the flange, said annulus being composed of a material of lower coefficient of expansion than the material of the brake drum and serving to rigidify and minimize thermal expansion of the drum.

RAYMOND J. NORTON.